United States Patent [19]

Winderl

[11] Patent Number: 4,860,874

[45] Date of Patent: Aug. 29, 1989

[54] VIBRATING SLUICE BOX

[76] Inventor: Stephen Winderl, Box 236, Sleepy Hollow RV Ct., Lincoln, Mont. 59639

[21] Appl. No.: 176,223

[22] Filed: Mar. 31, 1988

[51] Int. Cl.[4] ............................................ B65G 11/20

[52] U.S. Cl. .................................... 193/2 B; 198/533; 209/480; 209/504

[58] Field of Search ........................ 193/2 B; 198/533; 209/479, 480, 503, 504

[56] References Cited

U.S. PATENT DOCUMENTS

| | | | |
|---|---|---|---|
| 289,018 | 11/1883 | Miller | 209/504 X |
| 667,514 | 2/1901 | Frey | 209/504 X |
| 1,056,305 | 3/1913 | Senn | 209/504 |
| 1,448,995 | 3/1923 | Dee | 209/504 X |
| 2,795,318 | 6/1957 | Morris | 198/752 |
| 3,058,576 | 10/1962 | Evans et al. | 198/752 |
| 3,133,628 | 5/1964 | Butler et al. . | |
| 3,173,768 | 3/1965 | Witte . | |
| 3,368,848 | 2/1968 | Hughes . | |
| 4,396,104 | 8/1983 | Beck | 193/2 B |

*Primary Examiner*—Andres Kashnikow
*Attorney, Agent, or Firm*—Jerry T. Kearns

[57] ABSTRACT

A sluice box has an open box frame formed from a plurality of welded beams. A trough having an arcuate transverse cross section is suspended in an inclined fashion within the frame by a plurality of chains. A low end of the trough has an end wall with a central aperture which serves as a sand drain. A transversely extending water overflow drain channel is disposed adjacent the low end trough wall. The bottom of the trough is provided with a series of spaced transverse ridges. A variable speed motor having a rotary output shaft with an eccentric weight and a cooling fan is secured to a bottom exterior surface of the trough, adjacent the low end wall, and serves to vibrate the trough. A second variable speed motor is utilized in conjunction with a pitman wheel and arm for reciprocating the trough from side to side. A pair of arcuate levers are pivotally mounted to the frame on opposite sides of the trough. A rubber wheel is rotatably mounted on a first end of each of the levers and a magnet is mounted on a second end of each of the levers. As the trough is reciprocated from side to side, the wheel on each of the levers contacts the side wall of the trough, causing the lever to pivot and strike the magnet on the second end of the lever against the bottom exterior surface of the trough.

12 Claims, 4 Drawing Sheets

VIBRATING SLUICE BOX

BACKGROUND OF THE INVENTION

1. Field of the Invention

The present invention relates to vibrating sluice boxes, and more particularly pertains to a new and improved vibrating sluice box for use in separating gold particles from a mixture of water, sand and sediment. Small particles of gold have been eroded by weather and glacial action from gold bearing deposits in various areas of the world. Over time, these gold particles are washed along streams and rivers. Due to the relatively large density of gold, these particles tend to settle and accumulate in the sand and sediment in stream and river beds. The present invention provides an improved device for economically separating such valuable gold particles from the sand and sediment of river and stream beds.

2. Description of the Prior Art

Various types of vibrating mining devices are known in the prior art. A typical example of such a vibrating mining device is to be found in U.S. Pat. No. 2,795,318, which issued to J. Morris on June 11, 1957. This patent discloses a vibratory conveyor for conveying pulverized fluidized particulate material. A motor driven pitman wheel and eccentrically attached pitman arm are utilized to reciprocate the conveyor bed. U.S. Pat. No. 3,058,576, which issued to R. Evans et al on Oct. 16, 1962, discloses a vibrating conveyor which utilizes a belt and pulley driven eccentric mechanism in conjunction with an electric motor to reciprocate a spring mounted conveyor bed. U.S. Pat. No. 3,133,628, which issued to W. Butler et al on May 19, 1964, discloses a vibrating shaker trough constructed from telescopically overlapping trough sections to accommodate expansion and retraction of the trough. U.S. Pat. No. 3,173,768, which issued to J. Witte on Mar. 16, 1965, discloses a vibratory device for treating granulated material. A granulated material, such as sugar, to be cooled or dried is supported on a thin perforated flexible sheet material mounted within a vibrated fluid chamber. Heated air is ducted beneath the flexible perforated strip. U.S. Pat. No. 3,368,848, which issued to C. Hughes on Feb. 13, 1968, discloses a mining machine having a shaking conveyor. A screw cutting head for use in mining coal has an attached adjustable pivotal vibrating conveyor. A fluid motor in conjunction with a pivotal linkage is utilized to oscillate the conveyor.

While the above mentioned devices are suited for their intended usage, none of these devices provides a vibrating sluice box which utilizes a first variable speed motor having an output shaft with an eccentric weight and a cooling fan and a second variable speed motor which drives a reciprocating pitman arm through a rotary pitman wheel Additionally, none of the aforesaid devices provides a sluice box which is suspended for side to side reciprocation within an open box frame having a pair of pivotally mounted striking arms positioned on opposite sides of the trough. Inasmuch as the art is relatively crowded with respect to these various types of vibrating sluice boxes, it can be appreciated that there is a continuing need for and interest in improvements to such vibrating sluice boxes, and in this respect, the present invention addresses this need and interest.

SUMMARY OF THE INVENTION

In view of the foregoing disadvantages inherent in the known types of vibrating sluice boxes now present in the prior art, the present invention provides an improved vibrating sluice box. As such, the general purpose of the present invention, which will be described subsequently in greater detail, is to provide a new and improved vibrating sluice box which has all the advantages of the prior art vibrating sluice boxes and none of the disadvantages.

To attain this, a representative embodiment of the concepts of the present invention is illustrated in the drawings and makes use of an open box frame formed from a plurality of welded beams. A trough having an arcuate transverse cross section is suspended in an inclined fashion within the frame by a plurality of chains. A low end of the trough has an end wall with a central aperture which serves as a sand drain. A transversely extending water overflow drain channel is disposed adjacent the low end trough wall. The trough is provided with a series of spaced transverse ridges. A variable speed motor having a rotary output shaft with an eccentric weight and a cooling fan is secured to a bottom exterior surface of the trough, adjacent the low end wall, and serves to vibrate the trough. A second variable speed motor is utilized in conjunction with a pitman wheel and arm for reciprocating the trough from side to side. A pair of arcuate levers are pivotally mounted to the frame on opposite sides of the trough. A rubber wheel is rotatably mounted on a first end of each of the levers and a magnet is mounted on a second end of each of the levers. As the trough is reciprocated from side to side, the wheel on each of the levers contacts the side wall of the trough, causing the lever to pivot and strike the magnet on the second end of the lever against the bottom exterior surface of the trough. Conventional controls are provided for regulating the speed of the motors.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vibrating sluice box which has all the advantages of the prior art vibrating sluice boxes and none of the disadvantages.

It is another object of the present invention to provide a new and improved vibrating sluice box which may be easily and efficiently manufactured and marketed.

It is a further object of the present invention to provide a new and improved vibrating sluice box which is of a durable and reliable construction.

An even further object of the present invention is to provide a new and improved vibrating sluice box which is susceptible of a low cost of manufacture with regard to both materials and labor, and which accordingly is then susceptible of low prices of sale to the consuming public, thereby making such vibrating sluice boxes economically available to the buying public.

Still yet another object of the present invention is to provide a new and improved vibrating sluice box which provides in the apparatuses and methods of the prior art some of the advantages thereof, while simultaneously overcoming some of the disadvantages normally associated therewith.

Still another object of the present invention is to provide a new and improved vibrating sluice box which utilizes a first motor for vibrating a trough and second motor in conjunction with a pitman mechanism for transversely reciprocating a trough.

Yet another object of the present invention is to provide a new and improved vibrating sluice box which utilizes pivotally mounted arcuate levers for striking a trough.

Even still another object of the present invention is to provide a new and improved vibrating sluice box for providing an enhanced economic recovery of gold particles from the sand and sediment of stream and river beds.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above Will become apparent when consideration is given to the following detailed description thereof. Such description makes reference to the annexed drawings wherein.

DESCRIPTION OF THE PREFERRED EMBODIMENT

Figure 1:
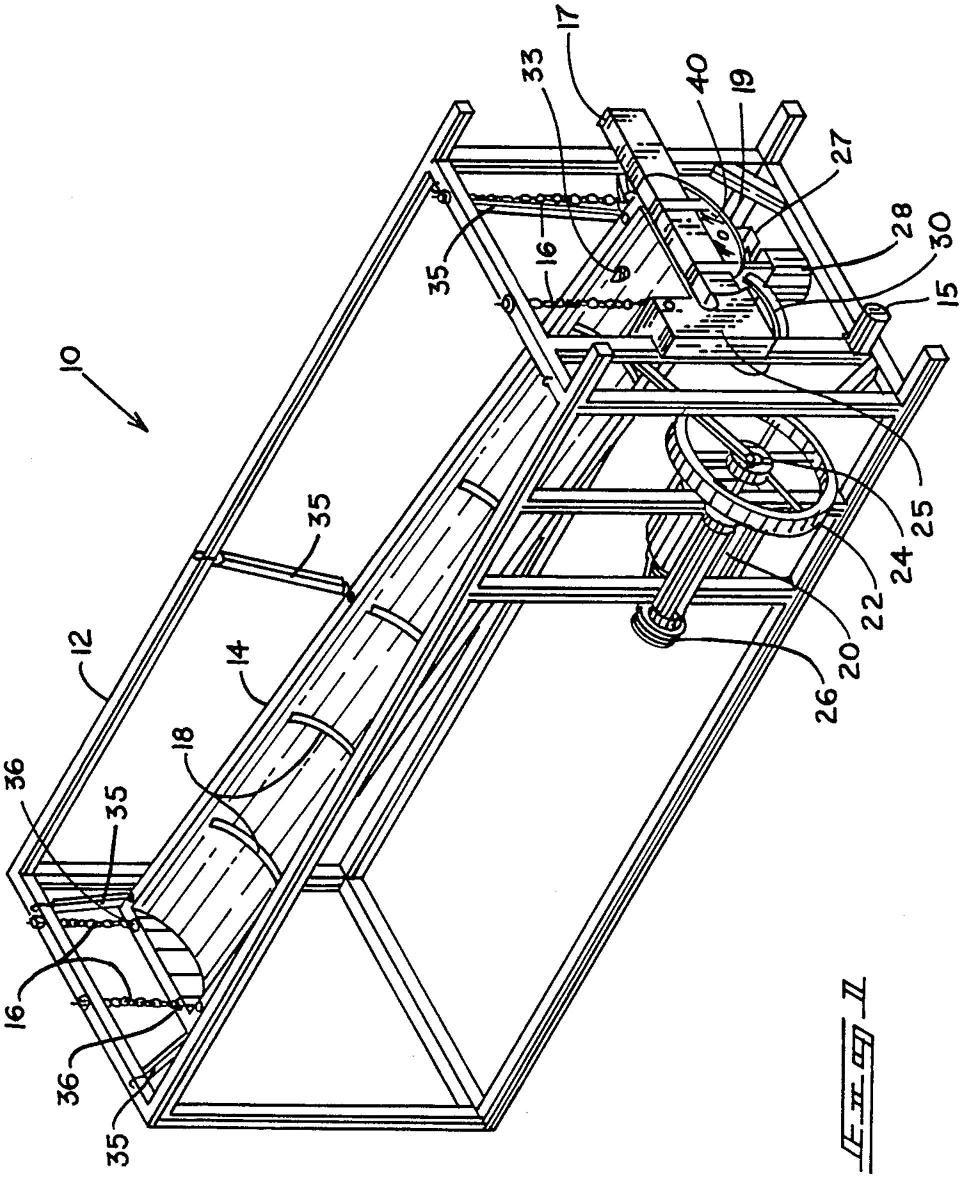
FIG. 1 is a perspective view of the vibrating sluice box of the present invention.

With reference now to the drawings, and in particular to FIG. 1 thereof, a new and improved vibrating sluice box embodying the principles and concepts of the present invention and generally designated by the reference numeral 10 will be described.

Figure 5:
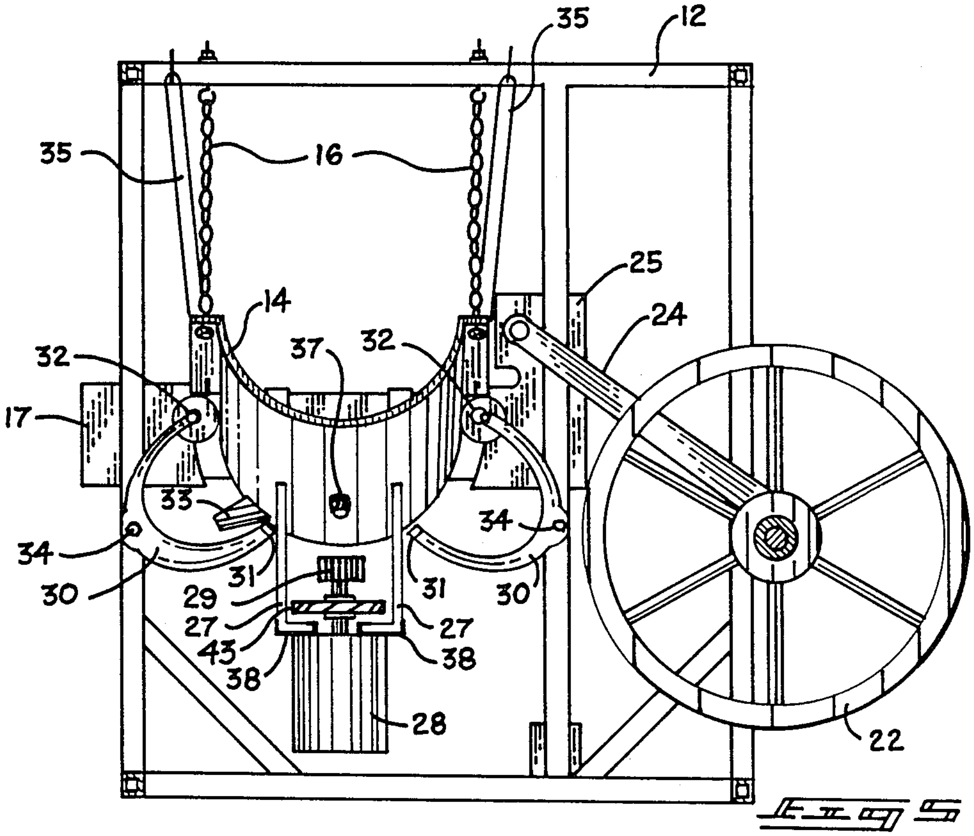
FIG. 5 is a transverse cross sectional view of the vibrating sluice box of the present invention, taken along 5—5 of FIG. 2.
Figure 6:
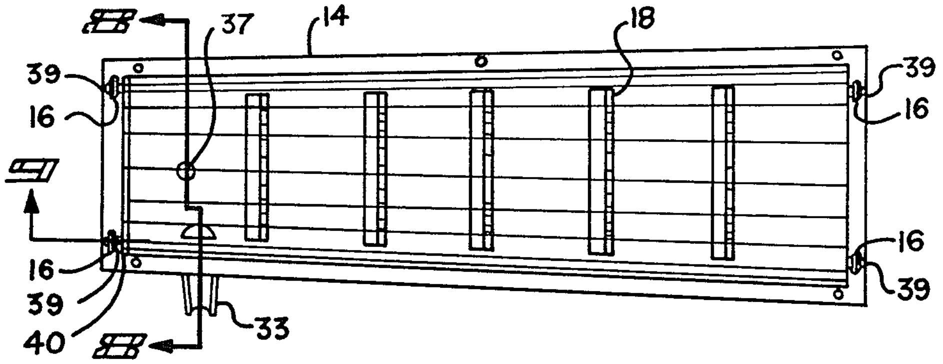
FIG. 6 is a top view of the trough of the sluice box.
Figure 7:
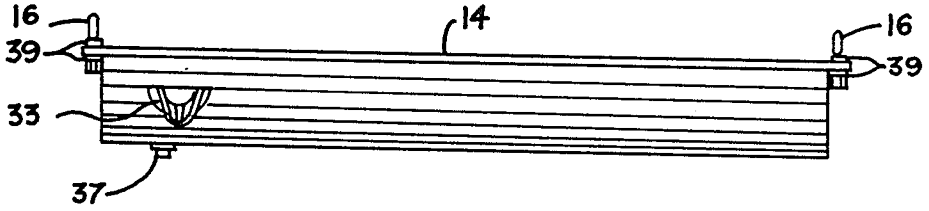
FIG. 7 is a side view of the trough of the sluice box.
Figure 8:
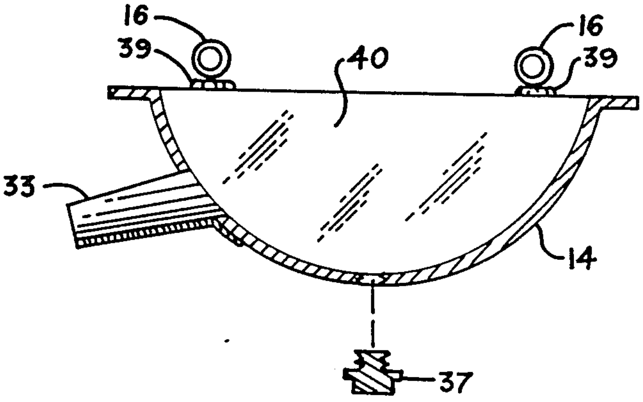
FIG. 8 a transverse cross sectional view of the trough, taken along line 8—8 of FIG. 6.
Figure 9:
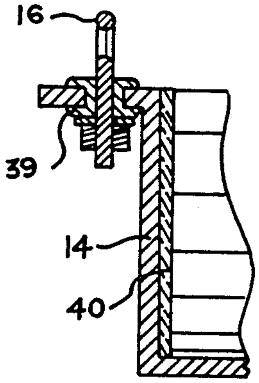
FIG. 9 is a partial detail view illustrating the insulated mounting of the trough.

More specifically, it will be noted that the first embodiment 10 of the invention includes a rectangular open box frame 12 formed from a plurality hollow welded beams. The exact configuration of the frame 12 may differ from that illustrated, without departing from the essential scope of the present invention. Wheels or casters may be secured to the frame 12 for ease of transportation. An elongated trough 14 having an arcuate transverse cross section is suspended within the box frame 12 by a plurality of chains 16. Transverse ridges 18 are spaced along the length of the bottom interior portion of the trough 14. The trough 14 has a transparent end wall 40 to allow observation of the build up of accumulated gold particles. A central aperture 19 is provided in a lower end wall of the trough 14 and serves to drain accumulated sand from the lower end of the trough. A transversely extending water overflow channel 33 directs water out of the lower end of the trough 14. A variable speed electric motor 20 is mounted on the frame 12 and serves to rotate a pitman wheel 22 via a belt and pulley drive 26. A pitman arm 24 has a first end eccentrically secured on the pitman wheel 22 and a second end attached to a side wall of the trough 14. Thus, operation of the motor 20 will cause the trough 14 to be reciprocated transversely from side to side within the frame 12. The frequency of reciprocation may be controlled by varying the speed of the motor 20. Another variable speed electric motor 28 is mounted on the exterior bottom surface of the trough 14, adjacent the lower end wall by brackets 27 and 38 (FIG. 5). The motor 28 has an output shaft with an eccentric counter weight for vibrating the trough 14. A pair of arcuate levers 30 are pivotally attached to the frame 12, on opposite sides of the trough 14. One of the levers 30 may be seen adjacent the lower end of the trough 14 in FIG. 1. A mounting bracket 25, 17 is utilized to secure the end of the pitman arm 24 to the trough 14. A conventional control unit 15 is secured on a front portion of the frame 12 and is utilized to regulate the speed of the motors 20 and 28. A plurality of rubber tie downs 35 are provided to damp the swinging, movement of the trough 14, to prevent the water flowing therein from splashing.

Figure 2:
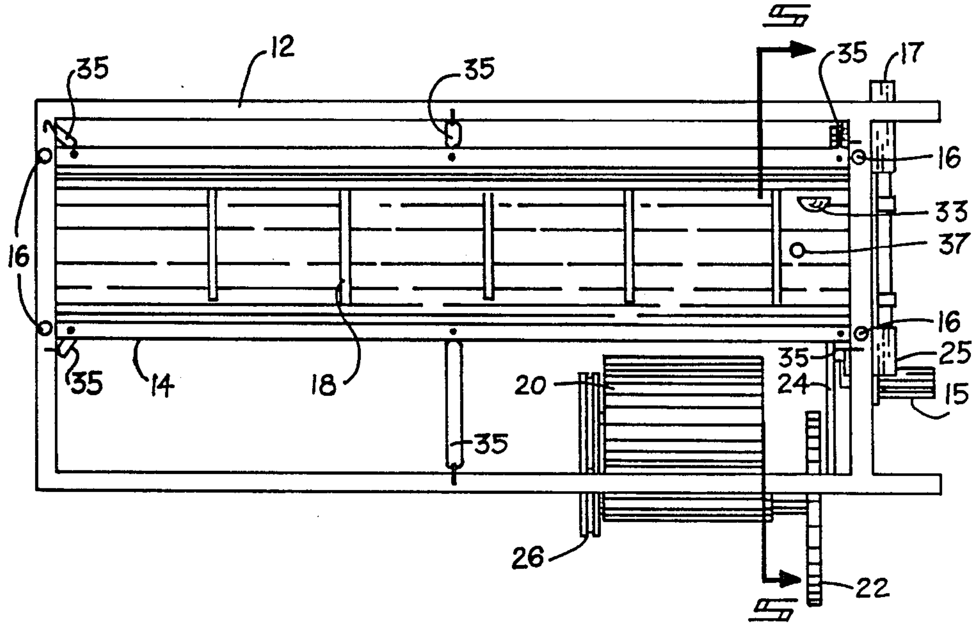
FIG. 2 is a top view of the vibrating sluice box of the present invention.

In FIG. 2, a top view of the vibrating sluice box 10 of the present invention is provided.

Figure 3:
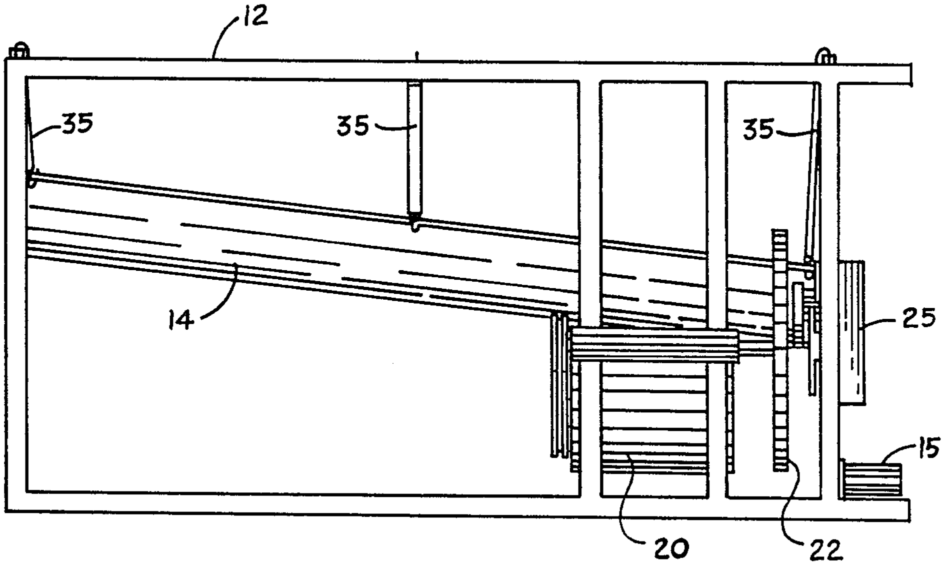
FIG. 3, is a side view of the vibrating sluice box of the present invention.

In FIG. 3, a side view of the vibrating sluice box 10 of the present invention is provided.

Figure 4:
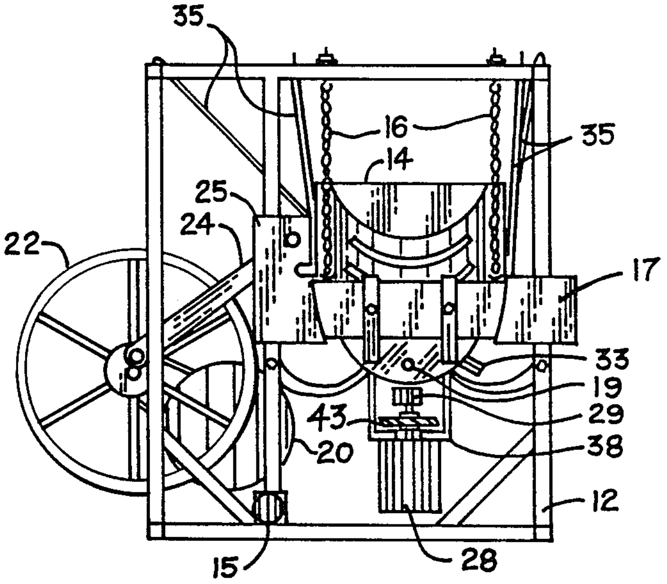
FIG. 4 is a front view of the vibrating sluice box of the present invention.

In FIG. 4, a front view of the vibrating sluice box 10 of the present invention is depicted. It may now be seen that the motor 28 has a rotary output shaft on which an eccentric counter weight 29 and a cooling fan 43 are secured.

With reference now to FIG. 5, a cross sectional view taken along line 5—5 of FIG. 2 is provided. The arcuate pivotal levers 30 are pivotally mounted by pins 34 on the frame 12 at opposite sides of the trough 14. A rubber wheel 32 is rotatably mounted at one end of each of the levers 30. A small magnet 31 is secured to an opposite end of each of the levers 30. As the trough 14 is rocked from side to side by the pitman wheel 22 and pitman arm 24, the side wall of the trough 14 will alternately contact the wheels 32 of the levers 30. When the wheel 32 of one of the levers 30 is struck by the trough 14, the lever will pivot about the pin 34, causing the magnet 31 on the opposite end of the lever 30 to strike the bottom exterior surface of the trough 14. A drain plug 37 is provided in the bottom of the trough 14 to facilitate clean out operations.

In FIGS. 6–9, the construction of the trough 14 is further illustrated. The suspension chains 16 are insulated from the trough 14 by rubber bushings 39.

With reference now to FIGS. 1 and 5, the manner of usage of the vibrating sluice box 10 of the present invention will now be described. A mixture of water, sand and sediment is introduced to the trough 14 adjacent the upper end thereof. As the water mixture flows by gravity along the bottom of the trough 14, the denser constituents of the sand and sediment will be deposited on the upstream side of the transverse ridges 18. The flowing movement of the water causes minute static electric charges to be built up on the very fine gold particles entrained in the water stream. These fine gold particles and the remaining suspended sand and sediment will be deposited adjacent the lower end of the trough 14 and the water will flow from the trough 14 via the channel 33. The deposited sand will pass through the aperture 19 out of the trough 14. As water, sand and sediment are continually introduced adjacent the upper end of the trough 14, the motor 20 in conjunction with the pitman wheel 22 and pitman arm 24 will reciprocate the trough 14 from side to side and the vibrating motor 28 will vibrate the trough and contents. As the trough 14 is reciprocated from side to side, the pivotal levers 30 will cause the magnets 31 to strike the bottom of the trough 14. The reciprocating, vibrating and striking actions of these mechanisms will cause the lighter sand and sedimentary materials to be separated from the extremely dense gold particles which will be deposited on the bottom of the trough 14. These valuable gold particles may then be economically recovered. The insulation of the trough 14 from the frame 12, in conjunction with the repeated tapping of the magnets 31, causes the statically charged gold particles to be attracted to the bottom of the trough.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved vibrating sluice box, comprising:

frame means;

inclined elongated trough means suspended from said frame means;

means for transversely reciprocating said trough means;

means for vibrating said trough means; and a pair of arcuate levers pivotally mounted on said frame means on opposite sides of said trough means for striking said trough means.

2. The vibrating sluice box of claim 1, wherein said frame means comprises an open box frame.

3. The vibrating sluice box of claim 2, wherein said open box frame is formed from a plurality of hollow welded beams.

4. The vibrating sluice box of claim, 1, wherein said trough means comprises an open trough having an arcuate bottom and side walls.

5. The vibrating sluice box of claim 4, further comprising a plurality of transverse ridges spaced along a bottom interior portion of said trough.

6. The vibrating sluice box of claim 5, further comprising a plurality of chains suspending said trough from said frame.

7. The vibrating sluice box of claim 1, wherein said means for transversely reciprocating said trough means comprises a variable speed motor mounted on said frame means;

a pitman wheel operatively connected for rotation by said motor; and a pitman arm having a first end eccentrically connected to said pitman wheel and an opposite end connected to said trough means.

8. The vibrating sluice box of claim 1, wherein said means for vibrating said trough means comprises a variable speed motor mounted on a bottom exterior surface of said trough means, adjacent a lower end of said trough means; and an eccentric counter weight on a rotary output shaft of said motor.

9. The vibrating sluice box of claim 1, wherein each of said levers has a rubber wheel rotatably mounted on a first end.

10. The vibrating sluice box of claim 9, further comprising a magnet secured to a second end of each of said pivotal levers.

11. The vibrating sluice box of claim 1, wherein said trough means further comprises a water overflow drain channel extending transversely adjacent a lower end wall of said trough means; and a sand drain aperture centrally formed in said lower end wall.

12. A new and improved vibrating sluice box, comprising:

a generally rectangular open box frame formed from a plurality of connected beams;

an elongated inclined trough having an arcuate transverse cross section suspended within said open rectangular box frame;

a plurality of chains suspending said trough within said frame;

a plurality of raised transverse ridges spaced along an interior bottom portion of said trough;

said inclined trough having a lower end wall provided with a central sand drain aperture;

a water overflow drain channel extending transversely from said trough, adjacent said lower end wall;

a first variable speed motor secured to a bottom exterior surface of said trough adjacent said lower end wall, said first motor having an output shaft with an eccentric weight and a cooling fan;

a pair of arcuate levers pivotally mounted on said frame on opposite sides of said trough;

a rubber wheel rotatably mounted on an upper end of each of said arcuate levers;

a magnet secured to a lower ed of each of said arcuate levers;

a pitman wheel mounted for rotation on said frame adjacent said lower end of trough wall;

a pitman arm having a first end eccentrically connected to said pitman wheel and a second end secured to said trough;

a second variable speed motor mounted on said frame and operatively connected for rotating said pitman wheel; and control means on said frame for said first and second motors.

* * * * *